United States Patent
Chen et al.

(10) Patent No.: US 10,337,493 B2
(45) Date of Patent: Jul. 2, 2019

(54) METHOD OF ADAPTIVELY ADJUSTING LIFT AND DRAG ON AN AIRFOIL-SHAPED SAIL, SAIL, AND WIND TURBINE

(71) Applicant: DONGGUAN UNIVERSITY OF TECHNOLOGY, Dongguan, Guangdong (CN)

(72) Inventors: Baiman Chen, Guangdong (CN); Guanfeng Qin, Guangdong (CN); Yongjun Xu, Guangdong (CN); Minlin Yang, Guangdong (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 132 days.

(21) Appl. No.: 15/788,783

(22) Filed: Oct. 19, 2017

(65) Prior Publication Data
US 2019/0078553 A1    Mar. 14, 2019

(30) Foreign Application Priority Data
Sep. 13, 2017    (CN) .......................... 2017 1 0825974

(51) Int. Cl.
*F03D 3/06* (2006.01)
*F03D 3/00* (2006.01)
*F03D 7/06* (2006.01)

(52) U.S. Cl.
CPC ............. *F03D 3/062* (2013.01); *F03D 3/005* (2013.01); *F03D 7/06* (2013.01); *F05B 2240/217* (2013.01); *F05B 2240/301* (2013.01); *F05B 2240/302* (2013.01); *F05B 2250/70* (2013.01); *F05B 2260/502* (2013.01); *F05B 2260/71* (2013.01); *Y02E 10/74* (2013.01)

(58) Field of Classification Search
CPC . F03D 3/062; F03D 3/005; F03D 7/06; F03D 7/022
See application file for complete search history.

(56) References Cited

U.S. PATENT DOCUMENTS 1,810,693 A * 6/1931 Alfaro ..................... B64C 21/02
244/204
2,507,611 A * 5/1950 Pappas ..................... B64C 21/02
244/198

(Continued)

FOREIGN PATENT DOCUMENTS

CN    102686875 B    1/2015

*Primary Examiner* — Eldon T Brockman

(57) ABSTRACT

Disclosed is a method of adaptively adjusting lift and drag on an airfoil-shaped sail. The method includes: (1) mounting at least one airfoil-shaped sail body having an airfoil-shaped cross section; (2) defining a Y-shaped air jet channel in the airfoil-shaped sail body; (3) arranging a flow regulating gate in the Y-shaped air jet channel; (4) adjusting the flow regulating gate to automatically adjust the gate opening extent and the cross section opening or closing extent in response to an oncoming flow with a varying direction and speed, to regulate the airflow within the air jet channel and accordingly change the angle of attack, so that the lift and drag on the sail body can be automatically adjusted as the wind speed changes. Further disclosed are an airfoil-shaped sail implementing the above method as well as a vertical-axis wind turbine employing the airfoil-shaped sail.

17 Claims, 9 Drawing Sheets

(56) References Cited

U.S. PATENT DOCUMENTS

| | | | | |
|---|---|---|---|---|
| 6,334,753 B1* | 1/2002 | Tillman | ............... | B64C 21/04 |
| | | | | 415/1 |
| 7,143,983 B2* | 12/2006 | McClure | ............... | B64C 15/14 |
| | | | | 244/204 |
| 7,222,819 B1* | 5/2007 | Kelnhofer | ............. | B64D 13/00 |
| | | | | 244/53 B |
| 7,520,465 B2* | 4/2009 | Mahjoub | ............... | B64C 7/00 |
| | | | | 165/44 |
| 7,708,229 B1* | 5/2010 | Angle, II | ............. | B64C 21/08 |
| | | | | 244/206 |
| 7,832,689 B2* | 11/2010 | Prince | ................ | B64C 23/06 |
| | | | | 244/200.1 |
| 8,240,993 B2* | 8/2012 | Bhaisora | ............. | F03D 1/0633 |
| | | | | 416/231 R |
| 8,449,255 B2* | 5/2013 | Tadayon | .............. | F03D 1/065 |
| | | | | 416/23 |
| 2003/0150962 A1* | 8/2003 | Orban | ................ | B64C 21/025 |
| | | | | 244/209 |
| 2009/0173834 A1* | 7/2009 | Prince | ................ | B64C 23/06 |
| | | | | 244/198 |
| 2011/0206507 A1* | 8/2011 | Bhaisora | ............. | F03D 1/0633 |
| | | | | 416/1 |
| 2016/0009374 A1* | 1/2016 | Glezer | ................ | G05D 7/01 |
| | | | | 244/99.13 |

* cited by examiner

US 10,337,493 B2

1

METHOD OF ADAPTIVELY ADJUSTING LIFT AND DRAG ON AN AIRFOIL-SHAPED SAIL, SAIL, AND WIND TURBINE

CROSS REFERENCE TO RELATED APPLICATIONS

The present application claims the benefit of Chinese Patent Application No. 201710825974.7 filed on Sep. 13, 2017. All the above are hereby incorporated by reference.

TECHNICAL FIELD

This disclosure relates generally to the technical field of wind power generation equipment, and more particularly relates to a method of adaptively adjusting lift and drag on an airfoil-shaped sail, as well as an airfoil-shaped sail and a wind turbine.

BACKGROUND

The emergence of vertical-axis wind turbine generators overcomes the shortcomings of horizontal-axis wind turbine generators in their physical structure. Yet, how to increase the wind capture area and improve the wind energy utilization factor still remains the core issues in the further development of wind power.

In an existing vertical-axis wind turbine operating with airfoil-shaped sails, a plurality of airfoil-shaped sails are arranged on a rotatable annular operating platform. Such wind turbines are capable of capturing wind energy from various angles and so can increase the wind capture area.

Traditional airfoil-shaped sails have a good wind capturing capability, but they cannot address the wind resistance. A ramjet-type airfoil-shaped sail not only retains the traditional airfoil-shaped sail's feature of large wind capture area, but a head and surface air ports design adopted by the ramjet-type airfoil-shaped sail also effectively reduces the wind resistance experienced by the sail. Partial resistance is converted into a motive force to facilitate the forward motion of the sail in the direction of the sail head, greatly enhancing the sail's wind capturing ability.

FIG. 1 shows a prior art ramjet-type airfoil-shaped sail, which employs the working principle of a jet wing. A good wing should be able to produce much lift and little resistance, and should also have sufficient strength and rigidity—hence invulnerable to deformation. A good wing should also be able to be easily controlled. There are many factors that determine the amount of lift generated by a wing, e.g., the lift can be directly related to the wing area, wind speed, etc. Such factors, however, usually cannot be or cannot be easily changed. For example, the air density cannot be changed; the wing area is usually subject to physical constraints; and the oncoming airflow velocity in the natural environment where the wing is placed is practically uncontrollable. Therefore, the goal of increasing the lift can only be achieved by increasing the lift coefficient. This is also the way to reduce the drag on the wing—mainly by managing to reduce the drag coefficient of the wing. The wing's lift and drag coefficients are determined by the wing's cross-sectional shape (i.e., airfoil type), the wing planform, and the then angle of attack. A good airfoil type can have a large lift coefficient as well as a small drag coefficient with respect to the same angle of attack, and the ratio of the two coefficients (called lift-to-drag ratio) can reach up to 18.

On the other hand, when its leading edge faces the wind, an airfoil-shaped sail yields the highest wind energy utilization factor, which decreases to certain degrees at other angles the sail faces the wind. Such airfoil-shaped sails, however, cannot make adaptive adjustments in response to different wind speeds and different angles of attack, resulting in a low average wind energy utilization factor.

China Patent Application No. ZL201080047198.9 had disclosed a water-floating sail wind turbine, which employs an air-channel array design to improve the lift-to-drag ratio. A plurality of ramjet-type airfoil-shaped sails are arranged over a water-floating operating platform to serve the function of capturing wind energy. Each ramjet-type airfoil-shaped sail includes a sail head, a sail tail, a group of head air inlets provided at the sail head, and an array of surface air channel ports defined in each of the two sail surfaces. The head air-inlet group is composed of a series of air-inlet ports located in the sail head. The surface air-channel port arrays are composed of surface multipolar air-channel ports distributed at the sail's two airfoil surfaces. Thus, the head air inlets and surface multipolar air channel ports form air jet channels inside the ramjet-type airfoil-shaped sail. As such, during the horizontal circular motion in different directions, the ramjet-type airfoil-shaped sails that are evenly distributed on the water-floating operation platform can always generate a favorable resultant force facilitating the forward motion with respect to different angles of attack.

But none of the above-mentioned prior arts solves the following problems.

First, no single airfoil-shaped sail is able to synchronously adjust the flow guidance capacity of the jet channel in response to the airflow direction, speed, and force in the wind field where the sail is situated, to obtain the maximum lift-to-drag ratio and the optimal resultant force facilitating the sail's circular motion.

Second, no single airfoil-shaped sail is capable of adaptive regulation of its jet channel through the jet channel cross-sectional shape in combination with the number of jet channels, to obtain the maximum lift-to-drag ratio and the optimal resultant force facilitating the sail's circular motion.

Third, the adaptive regulation of the jet channel relies on a certain regular control to obtain the maximum lift-to-drag ratio and the optimal resultant force facilitating the sail's circular motion.

Fourth, considerations are not taken as to how to select the number of airfoil-shaped sails and arrange the position of each single sail, as well as how to enable each sail to adaptively adjust itself, to facilitate the whole wind turbine composed of a plurality of sails to achieve the optimal resultant force facilitating its circular motion.

Therefore, in-depth studies are yet still required on how to enable each airfoil-shaped sail to make synchronous and flexible adaptive adjustments to its own structure in response to the wind direction and speed in the wind site, so as to obtain the maximum lift-to-drag ratio and the optimal resultant force facilitating the sail's circular motion, maximizing the wind energy utilization factor.

SUMMARY

In view of the above-described shortcomings of the prior art, it is the primary objective of the disclosure to provide a method of adaptively adjusting lift and drag on an airfoil-shaped sail, as well as an airfoil-shaped sail, by which the gate opening extent can be regulated in response to different wind speeds thus improving the wind energy utilization factor of the airfoil-shaped sail, and the dynamic characteristics of the airfoil-shaped sail can also be improved based on the lift and drag of the wind acted on the airfoil-shaped sail as the angle of attack changes.

Another objective of the disclosure is to provide a wind turbine composed of a plurality of sails, each providing responsive lift and drag to wind speed changes, thereby achieving an optimal resultant force facilitating the sail's circular motion.

A technical solution adopted for achieving the above objectives follows. A method of adaptively adjusting lift and drag on an airfoil-shaped sail includes the following steps. First, a sail body consisting of at least one smaller airfoil-shaped sail each having an airfoil-shaped cross section is mounted, with each sail body provided with an upper cambered surface A and a lower cambered surface B. Second, at least one unidirectional air jet channel having a Y-shaped cross section is horizontally arranged inside the sail body to improve the dynamic characteristics of the sail body. The Y-shaped air jet channel includes an air inlet defined at a leading edge of the sail body, and two air outlets defined in the upper cambered surface A of the sail body. A centerline of the air inlet and that of either air outlet form an angle that lies in the range of 45°~60°. Third, a flow regulating gate that is responsive to wind direction and speed and capable of automatically opening and closing the cross section of the Y-shaped air jet channel is arranged in the Y-shaped air jet channel. Fourth, in response to the oncoming flows with different directions and speeds towards the sail, the flow regulating gate automatically adjusts the gate opening extent and the cross section opening extent, so as to regulate the airflow within the air jet channel to further change the angle of attack to improve the sail's dynamic characteristics, thereby adaptively adjusting the lift and drag on the airfoil-shaped sail as the wind speed changes, to obtain a maximum lift-to-drag ratio and an optimal resultant force facilitating the sail's circular motion, improving the sail's wind energy utilization factor.

The flow regulating gate in the above third step is an one-way valve, which is disposed at the air inlet of the air jet channel and opens only inward to the inside of the air jet channel. At an inner side of the valve is provided an adaptive and self-reset opening and closing control device, which controls the gate's cross-section opening extent based on a wind-speed-change adaptive process function as follows:)

$$X = F/(a^* \cos 45°) \quad (3)$$

$$F = Sv2\rho \quad (4)$$

where X is a distance the gate opens along the jet channel, F denotes a force acted on the gate by the airflow, S is a cross-sectional area of the gate, v denotes an airflow rate, and ρ represents an airflow density.

The above-described adaptive and self-reset opening and closing control device may be a hydraulic support rod or a spring support rod wound with a metal spring. The hydraulic support rod or spring support rod may be arranged inside the air jet channel, with both ends thereof connected to the valve and an inner wall of the jet channel respectively using T-shaped joints.

In the above second step, an opening height h and width L of each of the air inlet and outlets of the defined jet channel satisfy the following relations:

$$\frac{1}{8}H \geq h \geq \frac{3}{40}H \quad (1)$$

$$\frac{2}{5}c \geq L \geq \frac{1}{3}c \quad (2)$$

where H denotes a height of each airfoil-shaped sail, c represents a maximum thickness of the airfoil-shaped sail.

The above fourth step may be particularly subdivided into the following scenarios.

In a first scenario where a leading edge of the airfoil-shaped sail faces the wind, the angle of attack is 0°. As such, when the airfoil-shaped sail is placed in a low wind speed environment where the wind speed is lower than a rated opening-triggering wind speed of the flow regulating gate, the flow regulating gate would remain completely closed so that the oncoming flow would be divided into two streams at the leading edge of the airfoil-shaped sail. The two streams would then flow over the upper cambered surface A and the lower cambered surface B, respectively, retaining to the maximum extent the lift generating characteristics of the airfoil-shaped sail, facilitating the airfoil-shaped sail to start off in the low wind speed environment.

In another scenario where the leading edge of the airfoil-shaped sail faces the wind and the oncoming flow speed is greater than a set regulation-triggering wind speed, the flow regulating gate would then be opened to automatically adjust the airflow within the air jet channel. Thus, the oncoming flow would be divided into three streams at the leading edge of the airfoil-shaped sail. Two of the three streams would flow through the upper cambered surface A and the lower cambered surface B, respectively. The other stream would enter the Y-shaped air jet channel through the flow regulating gate. After entering the Y-shaped air jet channel, this stream would then flow outside of the two air outlets, thereby producing a reactive thrust on the airfoil-shaped sail. Meanwhile, the two streams that flow over the upper and lower cambered surfaces A B will generate a lift on the airfoil-shaped sail. As a result, the lift, combined with the reactive thrust, would jointly drive the airfoil-shaped sail into motion in the direction of its leading edge.

In yet another scenario where a trailing edge of the airfoil-shaped sail faces the wind forming an angle of attack of 180°, the oncoming flow would be divided into two streams at the trailing edge of the airfoil-shaped sail. The two streams would then flow over the upper cambered surface A and the lower cambered surface B, respectively. The stream flowing over the upper cambered surface A would move past the air outlets (the air outlets as defined above, but they actually serve as air inlets in this scenario) so that partial airflow may enter the Y-shaped air jet channel via the air outlets. Because the gate opens only towards the inside of the Y-shaped air jet channel, the airflow entering the Y-shaped air jet channel will be blocked by the flow regulating gate. Thus, the kinetic energy of the airflow would be converted to a thrust on the gate that points to the leading edge of the airfoil-shaped sail and so can drive the airfoil-shaped sail to move forward in the direction of its leading edge.

An airfoil-shaped sail implementing the above-described method is further provided. The airfoil-shaped sail includes a sail body having an airfoil-shaped cross section and provided with an upper cambered surface A and a lower cambered surface B. The sail body may be composed of a set of smaller airfoil-shaped sails vertically pin-connected. Inside each set of smaller airfoil-shaped sails, one or more unidirectional air jet channels each having a Y-shaped cross section may be horizontally arranged for the purpose of improving the dynamic characteristics of the airfoil-shaped sail. Each Y-shaped jet channel includes an air inlet provided at the leading edge of the sail body, and two air outlets defined in the upper cambered surface A of the sail body. A centerline of the air inlet and that of each of the air outlets may form an acute angle of 45°~60°. In the Y-shaped air jet channel may further be arranged a flow regulating gate which is responsive to the wind direction and speed and is capable of automatically opening and closing a cross section of the Y-shaped air jet channel. In response to an oncoming flow with varying direction and speed towards the sail, the flow regulating gate can automatically adjust the gate opening extent and the cross section opening extent, to regulate the airflow within the air jet channel so as to accordingly change the angle of attack to improve the sail's dynamic characteristics, thereby automatically adjusting the lift and drag on the airfoil-shaped sail as the wind speed changes, to obtain a maximum lift-to-drag ratio and an optimal resultant force facilitating the sail's circular motion, improving the sail's wind energy utilization factor.

The flow regulating gate is a one-way valve, which is arranged at the air inlet of the air jet channel and opens only inward to the inside of the air jet channel. At an inner side of the valve may be provided an adaptive and self-reset opening and closing control device, which controls the gate's cross section opening extent based on a wind-speed-change adaptive process function as follows:)

$$X = F/(a * \cos 45°) \quad (3)$$

$$F = Sv2\rho \quad (4)$$

where X is a distance the gate opens along the jet channel, F denotes a force acted on the gate by the airflow, S is a cross-sectional area of the gate, v denotes an airflow rate, and ρ represents an airflow density.

The above-described adaptive and self-reset opening and closing control device may be a hydraulic support rod or a spring support rod wound with a metal spring. The hydraulic support rod or spring support rod is arranged inside the air jet channel, with both ends thereof connected to the gate and an inner wall of the jet channel, respectively, using a T-shaped joint.

An opening height h and width L of each of the air inlet and outlets of the defined jet channel satisfy the following relations:

$$\frac{1}{8}H \geq h \geq \frac{3}{40}H \quad (1)$$

$$\frac{2}{5}c \geq L \geq \frac{1}{3}c \quad (2)$$

where H denotes a height of each airfoil-shaped sail, c represents a maximum thickness of the airfoil-shaped sail.

A vertical-axis wind turbine employing the above airfoil-shaped sail is further disclosed. The vertical-axis wind turbine includes a rotatable annular operating platform and a plurality of airfoil-shaped sails arranged vertical to the platform plane and evenly in an annulus. To enable the vertical-axis wind turbine to obtain an optimal resultant force facilitating its circular motion, the airfoil-shaped sails should satisfy the following conditions.

First, the number of the airfoil-shaped sails mounted on the operating platform should be an odd number, so as to avoid that when the wind turbine faces the wind the wind would blow in from the gap between two adjacent blades and then out of the opposite diagonal gap such that the airflow would produce resistance against the circular motion of the wind turbine.

Second, for considerations of dynamic characteristics and safety factors, a height H of each airfoil-shaped sail and a radius R of the operating platform of the vertical-axis wind turbine should satisfy the following relation:

$$0.8H \leq R \leq H \quad (7)$$

The method, airfoil-shaped sail, and wind turbine that are disclosed by this application can provide the following advantages.

First, large wind capture area. When situated in winds with different angles of attack, each single airfoil-shaped sail is capable of generating a maximum resultant force based on the lift and drag acted on the airfoil-shaped sail by the airflow, to drive the sail into motion in the direction of its leading edge.

Second, wind energy utilization factor. When situated in a low wind speed environment where the wind speed is lower than the rated opening-triggering wind speed of the flow regulating gate, then the gate of each single airfoil-shaped sail would be completely closed, retaining the dynamic characteristics of the airfoil-shaped sail to the largest extent, more conducive to the starting of the airfoil-shaped sail. When placed in an environment where the wind speed is greater than the rated opening-triggering wind speed, the hydraulic support rod can regulate the gate opening extent in response to the wind force, so that partial airflow would flow through the Y-shaped air jet channel and then flow out from the air outlets, producing a reactive thrust. Therefore, the thrust, combined with the wind's lift on the airfoil-shaped sail, would jointly drive the airfoil-shaped sail into motion, resulting in a high conversion ratio from wind energy at different wind speeds to the kinetic energy of the airfoil-shaped sail.

Third, by the vertical-axis wind turbine composed of a plurality of airfoil-shaped sails (the total number of which is an odd number) as blades, each airfoil-shaped sail can attain adaptive lift and drag at its spot in the wind field, thereby achieving an optimal resultant force facilitating the sail's circular motion.

BRIEF DESCRIPTION OF THE ACCOMPANYING DRAWINGS

Figure 1:
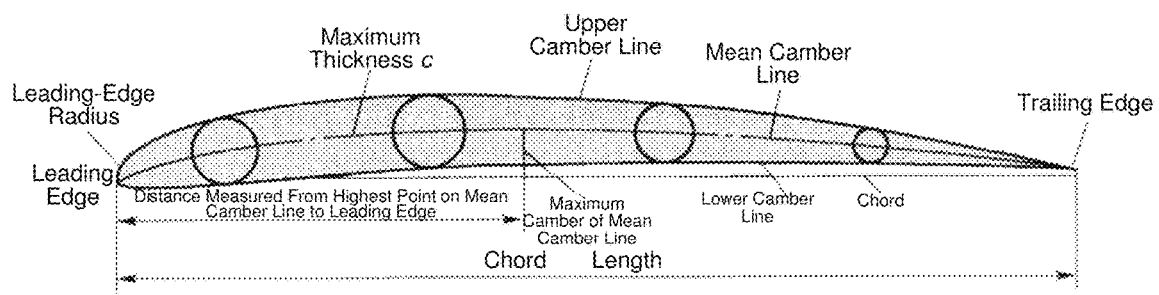
FIG. 1 is a schematic cross-sectional view of a prior art airfoil-shaped sail.

Throughout these drawings, various parts or components are represented by the following numerals:
1—Sail Body;
2—Sail Body Leading Edge;
3—Sail Body Trailing Edge;
41—Y-Shaped Air Jet Channel;
42—Air Inlet;
43—Air Outlet;
44—Hydraulic Support Rod;
45—Gate;
46—Rod Groove;
441—T-Shaped Joint;
442—Piston Rod;
443—Hydraulic Cylinder.

DETAILED DESCRIPTION OF ILLUSTRATED EMBODIMENTS

To render the objectives, technical solutions, and advantages clearer and more definite, hereinafter the disclosure will be described in further detail with reference to the accompanying drawings. It will be appreciated that the specific embodiments described herein are merely illustrative of and are not intended to limit the disclosure.

This disclosure provides a method of adaptively adjusting lift and drag on an airfoil-shaped sail, an airfoil-shaped sail, as well as a vertical-axis wind turbine. This disclosure will be illustrated in more detail in the following detailed description.

FIGS. 2-10 illustrate a method of adaptively adjusting lift and drag on an airfoil-shaped sail as well as an airfoil-shaped sail in accordance with various embodiments of the disclosure. Sail body 1 is an airfoil having an airfoil-shaped cross section, with the airfoil type being an NACA low-speed airfoil, code-named NACA2413, meaning a maximum relative camber of the airfoil is 2% and is located at 40% chord back from the leading edge, and a maximum relative thickness of the airfoil is 13%.

According to this embodiment, the method of adaptively adjusting lift and drag on an airfoil-shaped sail includes the following steps.

First, a sail body 1 consisting of four vertically arranged smaller airfoil-shaped sails each having an airfoil-shaped cross section is mounted, with sail body 1 provided with an upper cambered surface A and a lower cambered surface B.

Second, multiple unidirectional air jet channels 41 each having a Y-shaped cross section are horizontally arranged inside sail body 1 to improve the dynamic characteristics of sail body 1. Each Y-shaped jet channel 41 may include an air inlet defined at leading edge 2 of sail body 1, and two air outlets 43 defined in upper cambered surface A of sail body 1. A centerline of air inlet 42 and that of each air outlet 43 may form an angle that lies in the range of 45°~60°, which means air jet channel 41 is a bent channel.

In this step, an opening height h and width L of each of the air inlet and outlets of the defined air jet channel may satisfy the following relations:

$$\frac{1}{8}H \geq h \geq \frac{3}{40}H \qquad (1)$$

$$\frac{2}{5}c \geq L \geq \frac{1}{3}c \qquad (2)$$

where H denotes a height of sail body 1 (also airfoil-shaped sail blade), c represents a maximum thickness of sail body 1.

Third, a flow regulating gate 45 that is responsive to wind direction and speed and is capable of automatically opening and closing a cross section of Y-shaped air jet channel 41 is arranged inside Y-shaped air jet channel 41.

In this step, flow regulating gate 45 may be an one-way valve, which is disposed at air inlet 42 or an air outlet 43 of air jet channel 41 and opens only inward to the inside of air jet channel 41. At an inner side of valve 45 may be provided an adaptive and self-reset opening and closing control device, which controls gate 45's cross section opening extent based on a wind-speed-change adaptive process function as follows:)

$$X = F/(a * \cos 45°) \qquad (3)$$

$$F = Sv2\rho \qquad (4)$$

where X is a distance the gate opens along the air jet channel, F denotes a force acted on the gate by the airflow, S is a cross-sectional area of the gate, v denotes an airflow rate, and ρ represents an airflow density.

The above-described adaptive and self-reset opening and closing control device may be a hydraulic support rod 44, or in other embodiments can also be a spring support rod wound with a metal spring. The hydraulic support rod 44 or spring support rod may be arranged inside air jet channel 41, with both ends of the hydraulic support rod 44 or spring support rod connected to gate 45 and an inner wall of air jet channel 41, respectively, using T-shaped joints.

Fourth, in response to an oncoming flow with a varying direction and speed blowing towards the sail, regulating gate 45 can automatically adaptively adjust its opening extent and cross section opening extent, so as to regulate the airflow within air jet channel 41 to accordingly change the angle of attack to improve the sail's dynamic characteristics, thereby automatically adjusting the lift and drag acted on the sail body 1 as the wind speed changes, to obtain a maximum lift-to-drag ratio and an optimal resultant force facilitating the sail's circular motion, improving the sail's wind energy utilization factor.

The fourth step may particularly include the following scenarios.

In a first scenario where leading edge 2 of sail body 1 faces the wind, the angle of attack is 0°. As such, when sail body 1 is placed in a low wind speed environment where the wind speed is lower than a rated opening-triggering wind speed of gate 45, gate 45 would remain completely closed so that the oncoming flow would be divided into two streams at leading edge 2 of sail body 1. The two streams would then flow over upper cambered surface A and lower cambered surface B, respectively, retaining to the maximum extent the lift generating characteristics of sail body 1, facilitating sail body 1 to set off in the low wind speed environment.

In another scenario where leading edge 2 of sail body 1 faces the wind and the oncoming flow speed is greater than a set regulation-triggering wind speed, gate 45 would then be opened to automatically adjust the airflow within air jet channel 41. Thus, the oncoming flow would be divided into three streams at leading edge 2 of sail body 1. Two of the three streams would flow through upper cambered surface A and lower cambered surface B, respectively. The other stream would enter Y-shaped air jet channel 41 through gate 45. After entering Y-shaped air jet channel 41, this stream would then flow outside of the two air outlets 43, thereby producing a reactive thrust on sail body 1. Meanwhile, the two streams that flow over the upper and lower cambered surfaces A and B will generate a lift on the airfoil-shaped sail. As a result, the lift, combined with the reactive thrust, would jointly drive the sail body 1 into motion in the direction of its leading edge 2.

In yet another scenario where trailing edge 3 of sail body 1 faces the wind forming an angle of attack of 180°, the oncoming flow would be divided into two streams at trailing edge 3 of sail body 1. The two streams would then flow over the upper and lower cambered surfaces A and B, respectively. The stream flowing over upper cambered surface A would move past air outlets 43 (in this scenario they actually serve as air inlets, but the above definitions will be adhered to throughout) so that partial airflow would enter Y-shaped air jet channel 41 via air outlets 43. Because gate 45 opens only towards the inside of Y-shaped air jet channel 41, the airflow entering Y-shaped air jet channel 41 will be blocked by gate 45. Thus, the kinetic energy of the airflow would be converted to a thrust on gate 45, which points to leading edge 2 of sail body 1 and so can drive sail body 1 to move forward in the direction of its leading edge 2.

Figure 2:
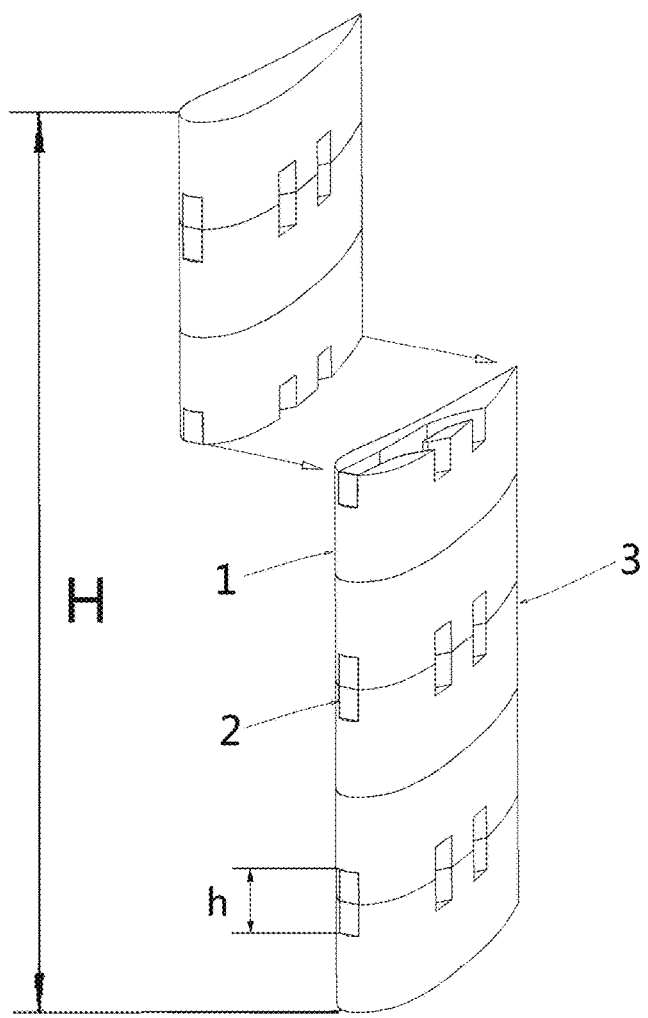
FIG. 2 illustrates an overall profile of an airfoil-shaped sail as well as a cross section of a set of smaller airfoil-shaped sails in accordance with the disclosure.

According to various embodiments of the disclosure, sail body 1 implementing the above method is illustrated in FIG. 2, in which sail body 1 is illustrated to consist of four smaller airfoil-shaped sails 1 that are arranged and pin-connected in the vertical orientation to facilitate processing, disassembly and installation, with sail body 1 provided with an upper cambered surface A and a lower cambered surface B. In other embodiments, the specific number of laminated smaller airfoil-shaped sails 1 can be chosen according to actual needs.

Y-shaped air jet channel 41 includes an air inlet 42 provided at leading edge 2 of sail body 1, two air outlets 43 defined in upper cambered surface A (i.e., the negative pressure side when leading edge 2 of sail body 1 faces the wind), as well as an air jet channel 41 connecting air inlet 42 and air outlets 43.

Typically, each smaller airfoil-shaped sail may be provided with an air inlet 42 and air outlets 43, with an centerline of air inlet 42 and that of each air outlet 43 forming an acute angle lying in the range of 45°~60°, where two to four air outlets 43 may be arranged in the airfoil-shaped sail. If air ports 42 and 43 are too large in dimensions, the lift generating capacity of airfoil-shaped sail 1 may be reduced; otherwise if their dimensions are too small, then the improvement of the dynamic characteristics may not be noticeable. Therefore, an opening height h and width L of each air inlet 42 or air outlet 43 should satisfy the following relations:

$$\frac{1}{8}H \geq h \geq \frac{3}{40}H \tag{5}$$

$$\frac{2}{5}c \geq L \geq \frac{1}{3}c \tag{6}$$

where H denotes a height of sail body 1 (also airfoil-shaped sail blade, c represents a maximum thickness of the sail body 1.

When processing Y-shaped air jet channel 41 inside each smaller airfoil-shaped sail 1, a middle intersecting surface of the sail can be taken as a dividing surface to divide the sail in half, and then relevant equipment can be used to process air jet channel 41. Thereafter, the two halves can be joined with each other to form a complete Y-shaped air jet channel 41 by pin connection.

Gate 45 is arranged at air inlet 42 of Y-shaped air jet channel 41, and is shaped to match with a curvature of leading edge 2 of sail body 1. Thus, when gate 45 is completely closed, the whole sail body 1 will be of a complete airfoil shape. Alternatively, gate 45 can be a flat shape. Gate 45 can be hingedly connected to an inner wall of air jet channel 41, with a hinge shaft arranged on a bottom surface of air inlet 42.

Hydraulic support rod 44 may be mounted in a rod groove 46 of the inner wall of air jet channel 41, and T-shaped joints 441 can further be used to fix hydraulic support rod 44 to rod groove 46 in the inner wall of air jet channel 41 and to gate 45. A stroke of a piston rod 442 of hydraulic support rod 44 may be so selected that hydraulic support rod 44 is extended to its maximum stroke at the position where gate 45 is completely closed, so as to achieve the one-way openability of gate 45. The cylinder length of hydraulic cylinder 443 of hydraulic support rod 44 may be so selected that hydraulic cylinder 443 is wholly disposed inside rod groove 46, in order that gate 45 can be fully opened. In other embodiments, hydraulic support rod 44 can alternatively be implemented as a spring support rod, an elastic rubber support rod, or the like devices capable of self-responsiveness to wind speed changes and self-resetting.

In accordance with the disclosure, the sail body 1 responsive to wind speed changes can regulate the opening extent of gate 45 in response to different wind directions and speeds so as to make different amounts of partial airflow pass through air jet channel 41, thereby improving the wind energy utilization factor of sail 1 body. Further, the angle of attack can be changed to improve the wind's lift and drag acted on sail body 1 thus improving its dynamic characteristics.

Figure 4:
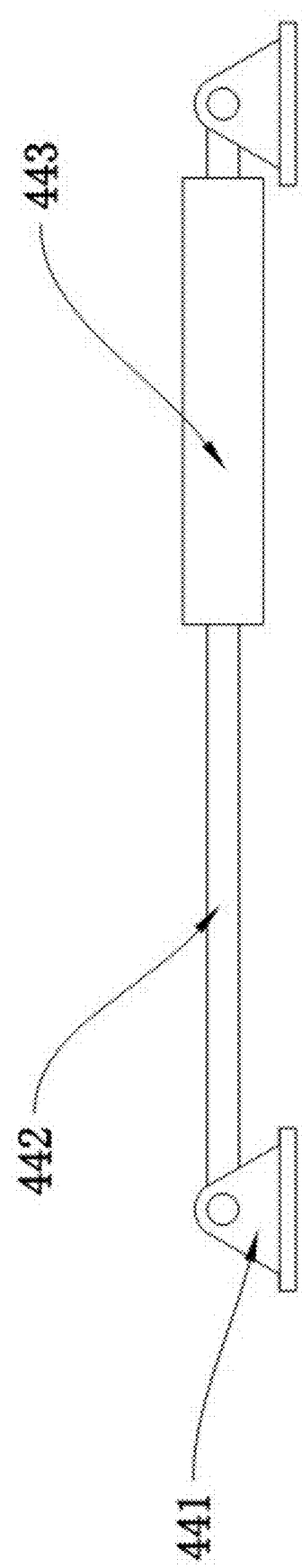
FIG. 4 is a schematic view of a hydraulic support rod in an airfoil-shaped sail in accordance with the disclosure.

FIG. 4 shows a schematic diagram illustrating the airflow when leading edge 2 of the sail body 1 faces the wind forming an angle of attack of 0°. When sail body 1 is situated in a low wind speed environment where the wind speed is lower than a rated opening-triggering wind speed of gate 45, gate 45 would completely close sail body 1, so that sail body 1 would present a normal configuration and the oncoming flow would be divided into two streams at leading edge 2 of sail body 1. As such, the two streams would then flow over upper cambered surface A and lower cambered surface B, respectively, retaining to the maximum extent the original lift generating characteristics of sail body 1, facilitating sail body 1 to start off in the low wind-speed environment. In addition, when sail body 1 is placed in an environment where the wind speed is greater than the rated wind speed, hydraulic support rod 44 may regulate the opening extent of gate 45 in response to the wind force, so that gate 45 turns to the opened state. Thus, the oncoming flow would be divided into three streams at leading edge 2 of sail body 1. Two of the three streams would flow through upper and lower cambered surfaces A and B, respectively. The other stream would enter Y-shaped air jet channel 41 through gate 45. After entering Y-shaped air jet channel 41, this stream would then flow outside the two air outlets 43, producing a reactive thrust on sail body 1. Meanwhile, the two streams flowing over upper and lower cambered surfaces A and B will generate a lift on the sail body 1. As a result, the lift, combined with the reactive thrust, would jointly drive sail body 1 into motion in the direction of its leading edge 2.

Figure 5:
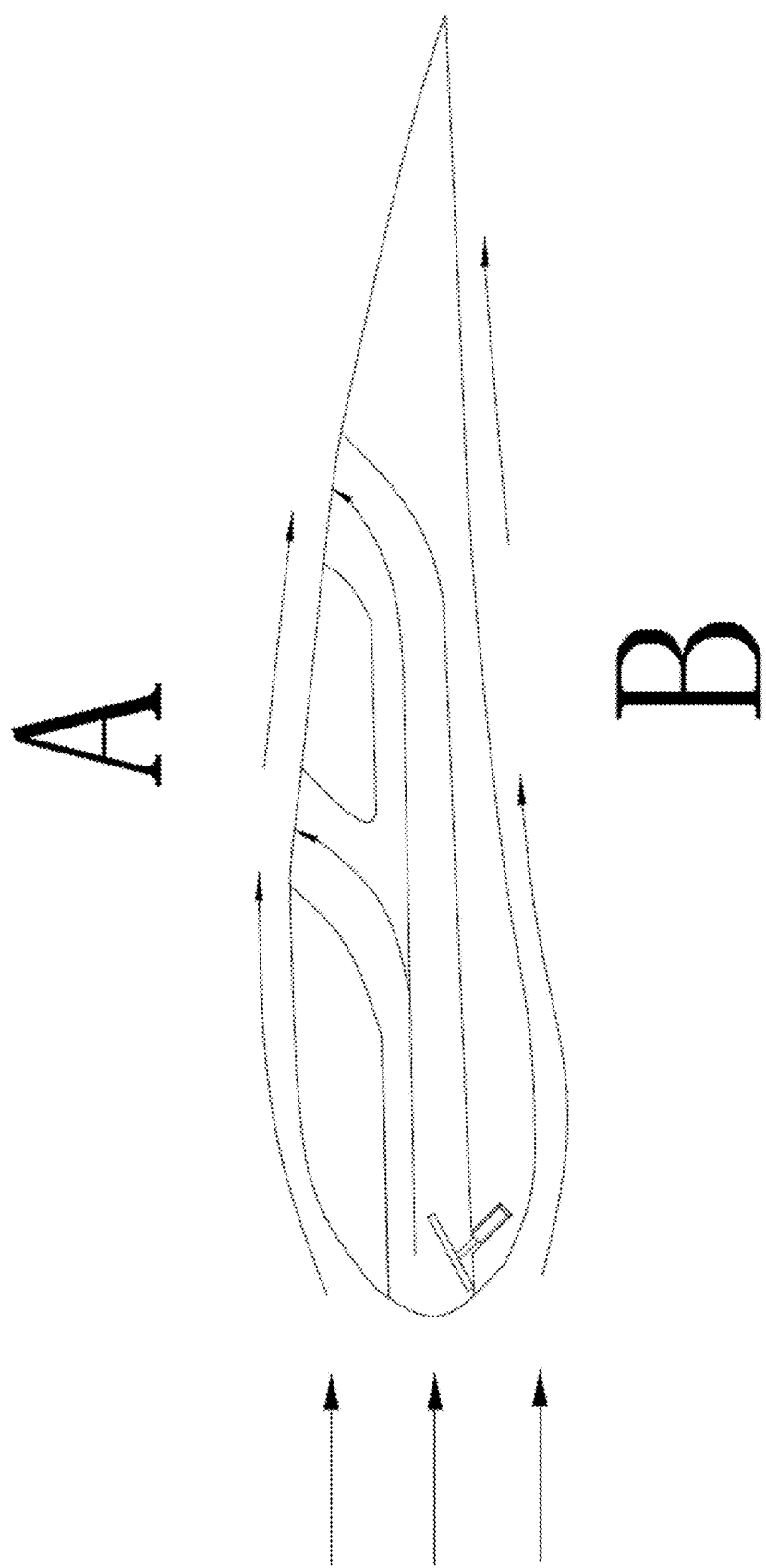
FIG. 5 is a schematic diagram of the airflow when a leading edge of an airfoil-shaped sail faces the wind in accordance with the disclosure.
Figure 6:
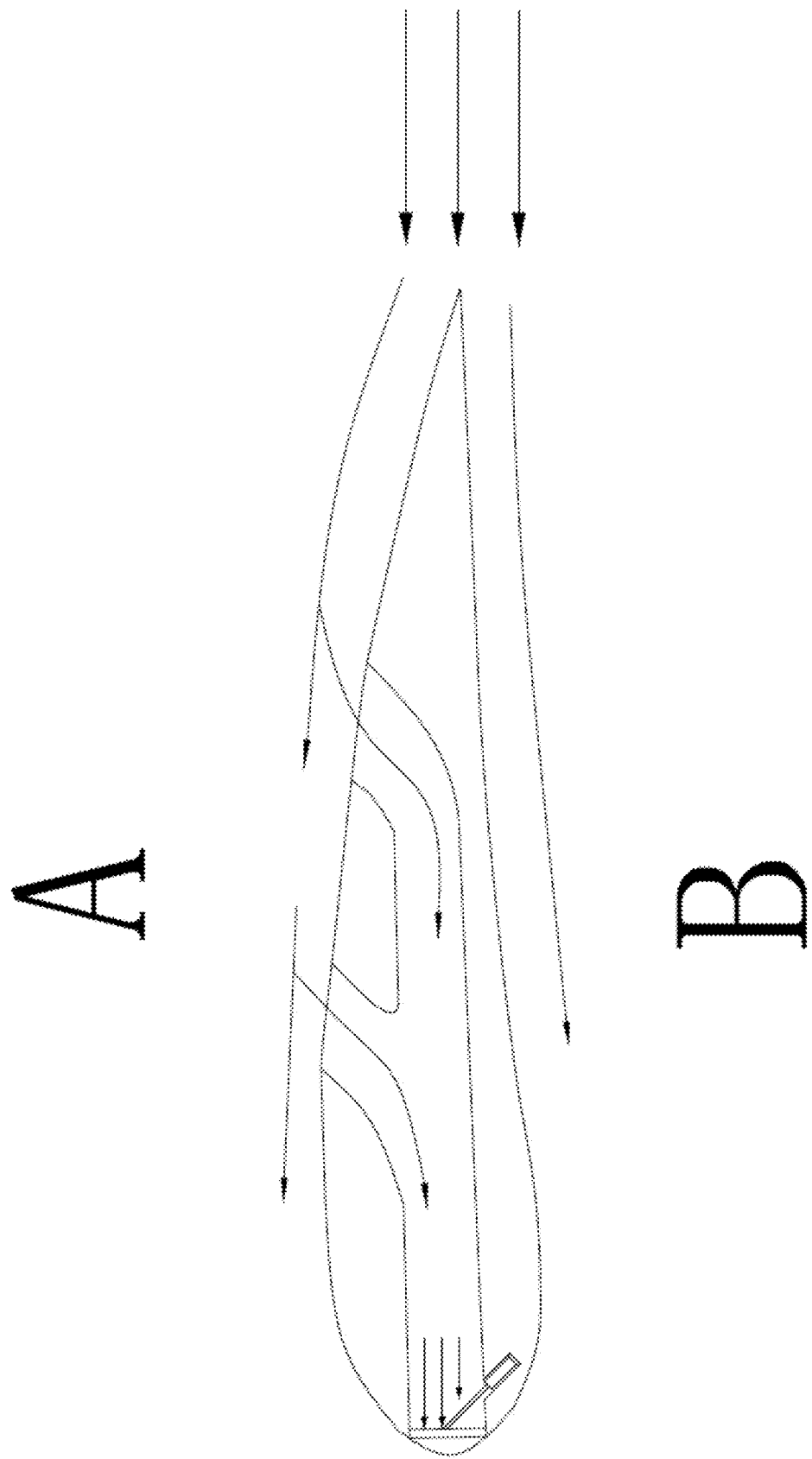
FIG. 6 is a schematic diagram of the airflow when a trailing edge of an airfoil-shaped sail faces the wind in accordance with the disclosure.

FIG. 5 shows a schematic diagram illustrating the airflow when trailing edge 3 of sail body 1 faces the wind forming an angle of attack of 180°. The oncoming flow would be divided into two streams at trailing edge 3 of sail body 1. As such, the two streams would flow over upper cambered surface A and lower cambered surface B, respectively. The stream that flows over upper cambered surface A would move past air inlet 42 so that partial airflow would enter Y-shaped air jet channel 41 through air inlet 42. Because gate 45 opens only towards the inside of Y-shaped air jet channel 41, the airflow entering Y-shaped air jet channel 41 will be blocked by gate 45 so that the kinetic energy of the airflow will be converted to a thrust on gate 45. The thrust points to leading edge 2 of sail body 1, and so would drive sail body 1 to move in the direction of its leading edge 2.

Figure 3:
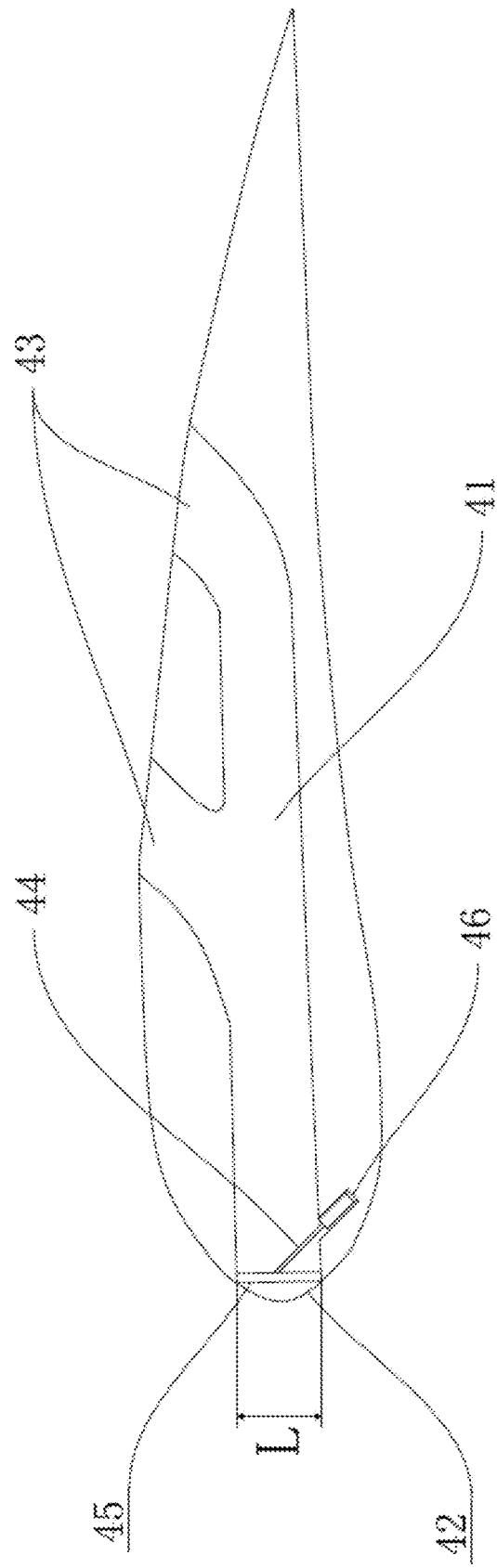
FIG. 3 is a top plan view of a cross section of an airfoil-shaped sail in accordance with the disclosure.

Disclosed further is a vertical-axis wind turbine employing the above sail body 1 which is airfoil-shaped and is capable of adaptively adjusting the lift and drag in response to wind speed changes. The vertical-axis wind turbine may include a rotatable annular operating platform as well as a plurality of airfoil-shaped sails as blades mounted vertical to the platform plane and evenly in an annulus. To enable the vertical-axis wind turbine based on the above sail body 1 (both upper cambered surface A and lower cambered surface B are provided with air ports as illustrated in FIG. 3) to obtain an optimal resultant force facilitating the circular motion of sail body 1, the sail bodies 1 (also blades) should satisfy the following conditions.

the first, the number of sail bodies or blades 1 arranged on the operating platform should be an odd number. If an even number of airfoil-shaped sail blades are evenly mounted on the operating platform, then these blades must be arranged in diagonal pairs, such that a gap between two adjacent blades and an opposite diagonal gap would form a direct open passage. As such, when the wind turbine faces the wind, the airflow will blow in from the gap between the two adjacent blades and then out of the opposite diagonal gap, such that the airflow would produce resistance against the circular motion of the wind turbine. The arrangement of an odd number of airfoil-shaped sail blades 1 can then avoid this situation.

Second, for considerations of dynamic characteristics and safety factors, a height H of airfoil-shaped sail blade 1 and a radius R of the operating platform of the vertical-axis wind turbine should satisfy the following relation:

$$0.8H \leq R \leq H \quad (7)$$

Embodiments of the disclosure have conducted a plurality of comparative experiments on the influence of the opening and closing of air ports 42 and 43 of air jet path 41 on the dynamic characteristics of sail body 1, by using an electric fan as the wind source to simulate the wind condition to which the above vertical-axis wind turbine would be subjected to in a normal working environment. The following data was collected from this experiment.

Note the angle is measured between an axis connecting the center of the wind source and the center of the wind turbine with the oncoming flow.

| Experimental Conditions | Opening or closing states of air ports | Rotational Speed (r/min) | Fastest Lap Speed (s) |
|---|---|---|---|
| Wind speed is about 4 m/s and angle is about 35° | All opened | 5.01 | 12.08 |
| | All closed | 5.16 | 11.69 |
| | B side port closed | 4.83 | 12.41 |
| | Front and A side ports closed | 5.19 | 11.37 |
| | A and B side ports closed | 5.00 | 11.84 |
| | Front and B side ports closed | 5.19 | 11.55 |
| Wind speed is about 4 m/s and angle is about 125° | All opened | 2.55 | 22.66 |
| | All closed | 4.80 | 12.70 |
| | B side port closed | 2.82 | 21.45 |
| | Front and A side ports closed | 4.93 | 12.06 |
| | A and B side ports closed | 4.23 | 13.73 |
| | Front and B side ports closed | 4.73 | 12.45 |

From the above experimental data, it is shown the experiment is carried out in a low wind speed environment. Now considering the air ports states ⑥, where the front port and the side port in lower cambered surface B are closed, under the two experimental oncoming flow conditions, the internal jet channel matches with the shape of Y-shaped air jet channel 41 according to the disclosure, and the measured average rotational speed is 4.96 rpm/min, which is relatively high across various sets of comparative experiments, hence good dynamic characteristics.

In the embodiments of the disclosure, sail body 1 capable of adaptively adjusting lift and drag in response to wind speed changes is modeled according to the embodiments described above and is simulated and studied by using a computational fluid dynamics method, in order to compare with the NACA low-speed airfoil (Hereinafter referred to as YX01) to verify the dynamic characteristics of airfoil-shaped sail body 1. The following analysis is provided based on the simulation results.

Figure 7:
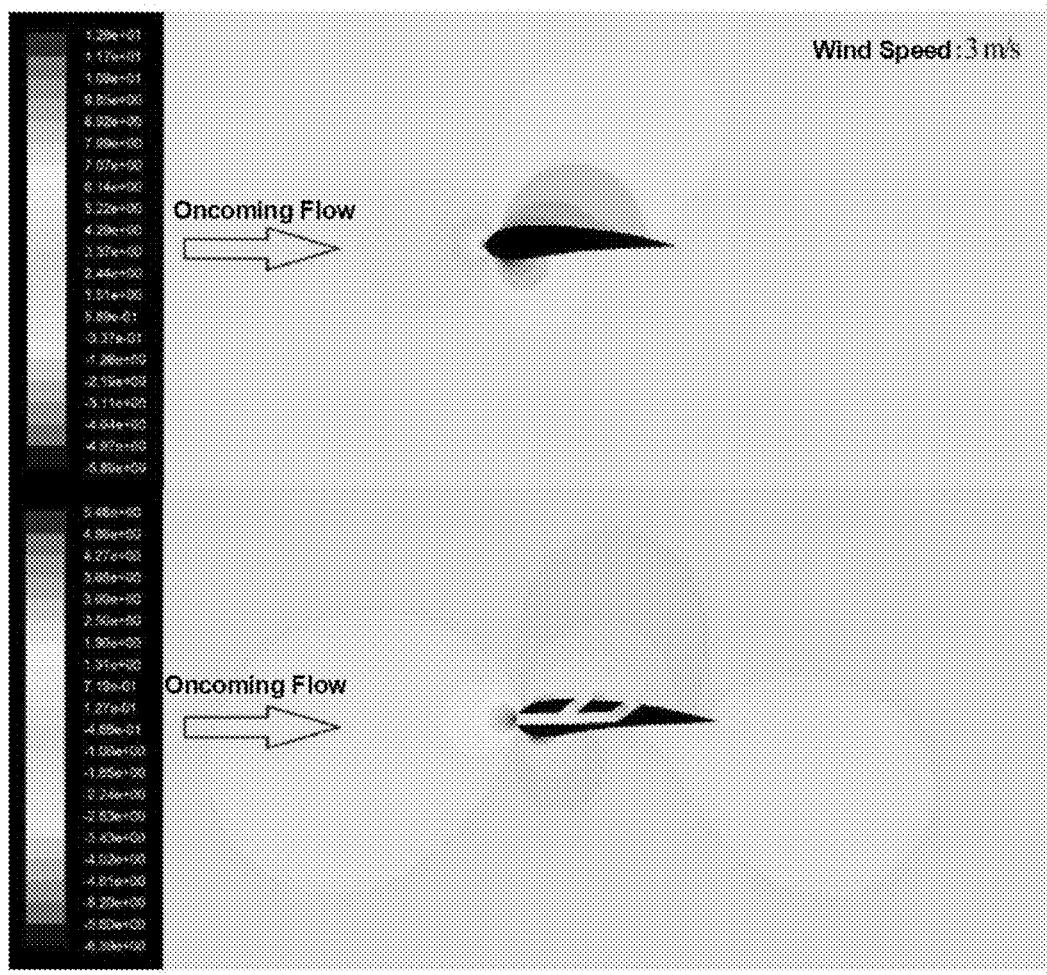
FIG. 7 is a schematic diagram illustrating a pressure distribution with an NACA low-speed airfoil contrasting with a pressure distribution of an airfoil-shaped sail in accordance with this application, under an angle of attack of 0° and a wind speed lower than the gate's rated opening-triggering wind speed.

First, as illustrated in FIG. 7, when situated in an environment where the wind speed is lower than the rated opening-triggering wind speed of gate 45, the pressures and flow rates near the boundaries of airfoil-shaped sail body 1 are basically the same as those of YX01. Therefore, when gate 45 is closed, sail body 1's capacity of generating lift in the upwind is close to that of YX01, and so sail body 1 can maintain the dynamic characteristics of the airfoil to the maximum extent.

Figure 8:
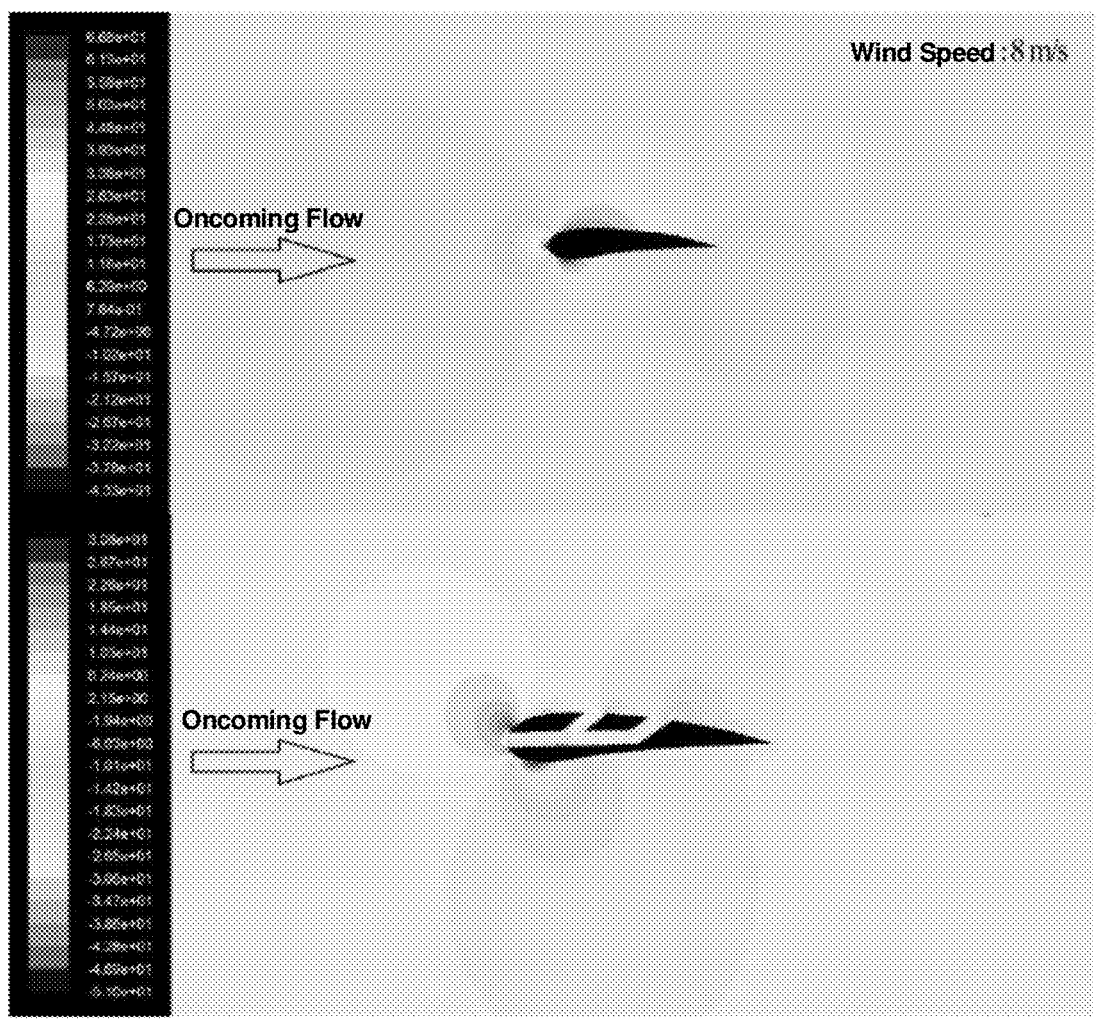
FIG. 8 is a schematic diagram illustrating a pressure distribution with NACA low-speed airfoil contrasting with a pressure distribution of an airfoil-shaped sail in accordance with this application, under an angle of attack of 0° and a wind speed higher than the gate's rated opening-triggering wind speed.

Second, as illustrated in FIG. 8, when situated in an environment where the wind speed is higher than the rated opening-triggering wind speed of gate 45, gate 45 would be opened and partial airflow would enter Y-shaped air jet channel 41 through air inlet 42, reducing the area of the high pressure zone at leading edge 2 of the airfoil, meaning the resistance produced by leading edge 2 of the sail body will be less than that of YX01.

Figure 9:
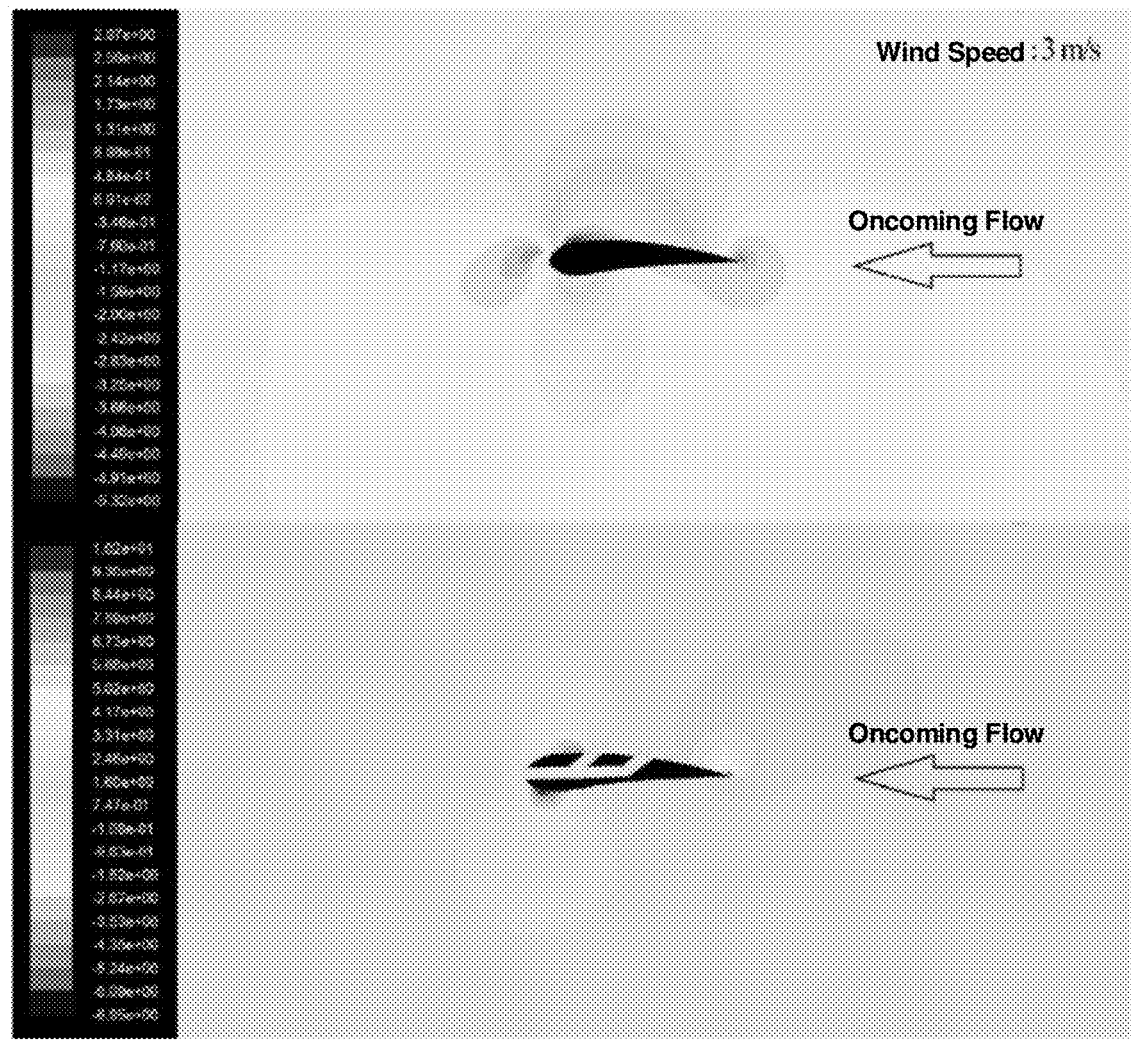
FIG. 9 is a schematic diagram illustrating a pressure distribution with NACA low-speed airfoil contrasting with a pressure distribution of an airfoil-shaped sail in accordance with this application, under an angle of attack 180° and a wind speed lower than the gate's rated opening-triggering wind speed.
Figure 10:
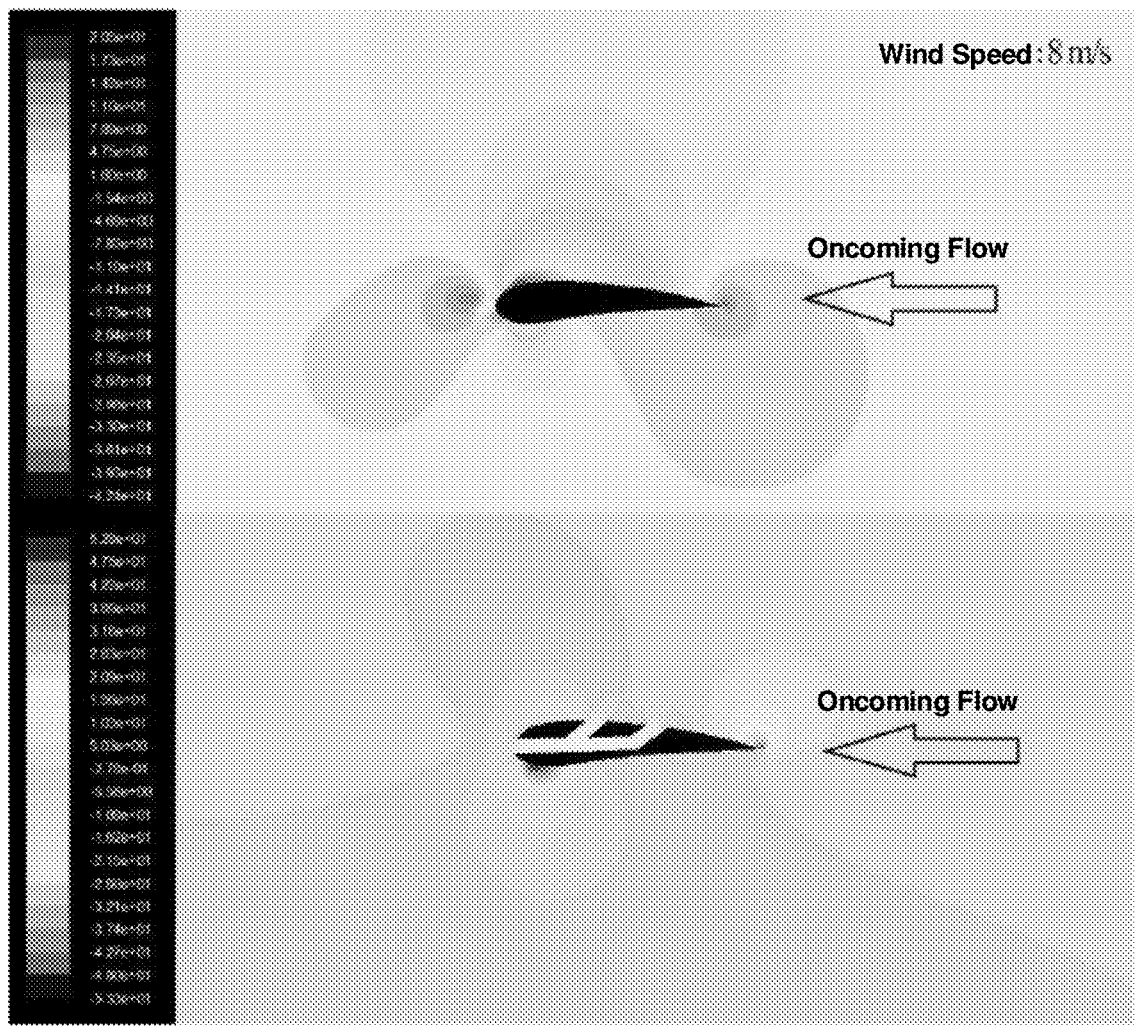
FIG. 10 is a schematic diagram illustrating a pressure distribution with an NACA low-speed airfoil contrasting with a pressure distribution of an airfoil-shaped sail in accordance with this application, under an angle of attack of 180° and a wind speed is higher than the gate's rated opening-triggering wind speed.

Third, as illustrated in FIGS. 9 and 10, the pressures within Y-shaped air jet channel 41 of sail body 1 are far higher than those at leading edge 2 of sail body 1, regardless of the wind speed conditions. Which implies the airflow is blocked by the one-way openable gate 45 after entering Y-shaped air jet channel 41, so that the kinetic energy of the airflow will be converted to a thrust on gate 45. The thrust will drive sail body 1 into motion in the direction of its leading edge 2—in contrast, YX01 is not able to generate the same thrust.

Based on the above analysis of the simulation results, this application has both the advantage of the YX01's capacity of generating a large lift force as leading edge 2 faces the wind, and the ability of driving itself into motion by taking advantage of the lift and drag. Therefore, the dynamic characteristics according this disclosure are significantly better than YX01.

It will be appreciated that applications of the disclosure will not be limited to the above examples, which can be improved or modified by those of ordinary skill in the art based on the foregoing description. Such improvements and modifications, however, shall all belong to the scope of protection defined by the appended claims of the disclosure.

What is claimed is:

1. A method of adaptively adjusting lift and drag on an airfoil-shaped sail, the method comprising:
   (1) mounting at least one airfoil-shaped sail body having an airfoil-shaped cross section, the sail body being provided with an upper cambered surface and a lower cambered surface;
   (2) arranging horizontally inside the airfoil-shaped sail body at least one unidirectional air jet channel having a Y-shaped cross section and used for improving dynamic characteristics of the airfoil-shaped sail body, the Y-shaped air jet channel comprising an air inlet defined at a leading edge of the sail body and two air outlets defined in the upper cambered surface of the sail body, with a centerline of the air inlet and that of each air outlet forming an angle lying in the range of 45°~60°;
   (3) arranging in the Y-shaped air jet channel a flow regulating gate responsive to wind direction and speed and capable of automatically opening and closing a cross section of the Y-shaped air jet channel; and
   (4) adjusting automatically an opening extent of the flow regulating gate and of the cross section in response to an oncoming flow with a varying direction and speed, to regulate airflow within the air jet channel and accordingly change an angle of attack to improve the sail body's dynamic characteristics, thereby automatically adjusting the lift and drag on the airfoil-shaped sail body as the flow speed changes, to obtain a maximum lift-to-drag ratio and an optimal resultant force facilitating the sail body's circular motion.

2. The method of claim 1, wherein the flow regulating gate in the step (3) is an one-way valve disposed at the air inlet of the air jet channel and opens only towards the inside of the air jet channel, and an adaptive and self-reset opening and closing control device is arranged at an inner wall of the valve, wherein the control device controls the opening extent of the gate's cross section based on a wind-speed-change adaptive process function as follows:)

$$X = F/(a^* \cos 45°) \quad (3)$$

$$F = Sv2\rho \quad (4)$$

where X is a distance the gate opens along the air jet channel, F denotes an airflow force acted on the gate, S is a cross-sectional area of the gate, v denotes an airflow rate, and ρ represents an airflow density.

3. The method of claim 2, wherein the adaptive and self-reset opening and closing control device is a hydraulic support rod or a spring support rod wound with a metal spring that is disposed in the air jet channel, with both ends of the hydraulic support rod or spring support rod connected to the gate and the inner wall of the air jet channel respectively using T-shaped joints.

4. The method of claim 1, wherein in the step (2) an opening height h and opening width L of each of the air inlet and outlets of the defined air jet channel satisfy the following relations:

$$\frac{1}{8}H \ge h \ge \frac{3}{40}H \quad (1)$$

$$\frac{2}{5}c \ge L \ge \frac{1}{3}c \quad (2)$$

where H denotes a height of the airfoil-shaped sail body, and c represents a maximum thickness of the airfoil-shaped sail body.

5. The method of claim 1, wherein the step (4) comprises:
   (41) when the leading edge of the airfoil-shaped sail body faces the wind forming an angle of attack of 0° and the airfoil-shaped sail body is situated in a low wind speed environment where the wind speed is lower than a rated opening-triggering wind speed of the gate, remaining, by the gate, completely closed so that at the leading edge of the airfoil-shaped sail body the oncoming flow is divided into two streams which flow over the upper cambered surface and the lower cambered surface respectively, maintaining to the maximum extent the lift generating characteristics of the airfoil-shaped sail body, facilitating the airfoil-shaped sail body to start off in the low wind-speed environment;
   (42) when the leading edge of the airfoil-shaped sail body faces the wind and the oncoming flow speed is greater than a set regulation-triggering wind speed, opening, by the gate, to automatically adjust the airflow inside the air jet channel, so that at the leading edge of the airfoil-shaped sail body the oncoming flow is divided into three streams, two of which flow through the upper and lower cambered surfaces and respectively, and the other stream enters the Y-shaped air jet channel through the gate and then flows outside the two air outlets, producing a reactive thrust on the airfoil-shaped sail, wherein the two streams flowing over the upper and lower cambered surfaces generate a lift on the airfoil-shaped sail body, and the lift, combined with the reactive thrust, jointly drives the airfoil-shaped sail body into motion in the direction of its leading edge.

6. The method of claim 5, wherein the step (4) further comprises:
   (43) when a trailing edge of the airfoil-shaped sail body faces the wind forming an angle of attack of 180°, dividing, by the trailing edge, the oncoming flow into two streams which flow over the upper and lower cambered surfaces respectively, wherein the stream that flows over the upper cambered surface moves past the air outlets so that partial airflow enters the Y-shaped air jet channel through the air outlets; and because the gate opens only towards the inside of the Y-shaped air jet channel, the stream entering the Y-shaped air jet channel is blocked by the gate so that the kinetic energy of the stream is converted to a thrust on the gate, the thrust pointing to the leading edge of the airfoil-shaped sail body and thus driving the airfoil-shaped sail body to move forward in the direction of its leading edge.

7. An airfoil-shaped sail comprising an airfoil-shaped sail body of an airfoil shape, the sail body being provided with an upper cambered surface and a lower cambered surface, wherein one or more unidirectional air jet channels each having a Y-shaped cross section are horizontally arranged inside the airfoil-shaped sail body for improving the dynamic characteristics of the airfoil-shaped sail; each Y-shaped air jet channel comprises an air inlet defined at a leading edge of the sail body, and two air outlets defined in the upper cambered surface of the sail body; a flow regulating gate responsive to wind direction and speed and capable of automatically opening and closing a cross section of the Y-shaped air jet channel is further arranged in the Y-shaped air jet channel; wherein in response to an oncoming flow with a varying direction and speed, the flow regulating gate automatically adjusts an opening extent of the gate and of the cross section, to regulate the airflow within the air jet channel and accordingly change an angle of attack to improve the airfoil-shaped sail's dynamic characteristics, thereby automatically adjusting the lift and drag on the airfoil-shaped sail as the wind speed changes, to obtain a maximum lift-to-drag ratio and an optimal resultant force facilitating airfoil-shaped sail's circular motion.

8. The airfoil-shaped sail of claim 7, wherein the flow regulating gate is a one-way valve, which is disposed at the air inlet of the air jet channel and opens only inward to the inside of the air jet channel, and at an inner wall of the valve is arranged an adaptive and self-reset opening and closing control device, which controls the opening extent of the gate cross section based on a wind-speed-change adaptive process function as follows:)

$$X=F/(a*\cos 45°) \tag{3}$$

$$F=Sv2\rho \tag{4}$$

where X is a distance the gate opens along the jet channel, F denotes an airflow force acted on the gate, S is a cross-sectional area of the gate, v denotes an airflow rate, and ρ represents an airflow density.

9. The airfoil-shaped sail of claim 8, wherein the adaptive and self-reset opening and closing control device is a hydraulic support rod or a spring support rod wound with a metal spring, which is disposed within the air jet channel, with both ends of the hydraulic support rod or spring support rod connected to the gate and to the inner wall of the jet channel respectively using T-shaped joints.

10. The airfoil-shaped sail of claim 7, wherein an opening height h and opening width L of each of the air inlet and outlets of the defined air jet channel satisfy the following relations:

$$\frac{1}{8}H \geq h \geq \frac{3}{40}H \tag{1}$$

$$\frac{2}{5}c \geq L \geq \frac{1}{3}c \tag{2}$$

Where H denotes a height of the airfoil-shaped sail, and c represents a maximum thickness of the airfoil-shaped sail.

11. The airfoil-shaped sail of claim 7, wherein the airfoil-shaped sail body comprises a set of a plurality of smaller airfoil-shaped sails arranged and pin-connected in vertical orientation.

12. The airfoil-shaped sail of claim 7, wherein a centerline of the air inlet and that of each of the air outlets of the Y-shaped air jet channel form an angle lying in the range of 45°~60°.

13. A vertical-axis wind turbine comprising a rotatable annular operating platform and a plurality of airfoil-shaped sails as blades mounted vertical to the platform plane and evenly in an annulus, wherein each airfoil-shaped sail comprises an airfoil-shaped sail body provided with an upper cambered surface and a lower cambered surface; one or more unidirectional air jet channels each having a Y-shaped cross section are horizontally arranged inside the airfoil-shaped sail body for improving the dynamic characteristics of the airfoil-shaped sail; each Y-shaped air jet channel comprises an air inlet defined at a leading edge of the sail body, and two air outlets defined in the upper cambered surface of the sail body; a flow regulating gate responsive to wind direction and speed and capable of automatically opening and closing a cross section of the Y-shaped air jet channel is further arranged in the Y-shaped air jet channel; wherein in response to an oncoming flow with a varying direction and speed, the flow regulating gate automatically adjusts an opening extent of the gate and of the cross section, to regulate the airflow within the air jet channel and accordingly change an angle of attack to improve the airfoil-shaped sail's dynamic characteristics, thereby automatically adjusting the lift and drag on the airfoil-shaped sail as the wind speed changes, to obtain a maximum lift-to-drag ratio and an optimal resultant force facilitating airfoil-shaped sail's circular motion, wherein to enable the vertical-axis wind turbine to obtain an optimal resultant force facilitating circular motion of the airfoil-shaped sails, wherein the airfoil-shaped sail blades satisfy the following conditions:

(1) the number of the airfoil-shaped sail blades arranged on the operating platform is an odd number, avoiding that when the wind turbine faces the wind the airflow blows in from a gap between two adjacent blades and then blows out of an opposite diagonal gap, and that the airflow produces resistance against the circular motion of the wind turbine;

(2) for considerations of dynamic characteristics and safety factors, a height H of each airfoil-shaped sail blade and a radius R of the operating platform of the vertical-axis wind turbine satisfy the following relation:

$$0.8H \leq R \leq H \tag{7}.$$

14. The vertical-axis wind turbine of claim 13, wherein each airfoil-shaped sail body comprises a set of a plurality of smaller airfoil-shaped sails arranged and pin-connected in vertical orientation.

15. The vertical-axis wind turbine of claim 13, a centerline of the air inlet and that of each of the air outlets of each Y-shaped air jet channel form an angle lying in the range of 45°~60°.

16. The vertical-axis wind turbine of claim 13, wherein the flow regulating gate is a one-way valve, which is disposed at the air inlet of the air jet channel and opens only inward to the inside of the air jet channel, and at an inner wall of the valve is arranged an adaptive and self-reset opening and closing control device, which controls the opening extent of the gate cross section based on a wind-speed-change adaptive process function as follows:)

$$X=F/(a*\cos 45°) \tag{3}$$

$$F=Sv2\rho \tag{4}$$

where X is a distance the gate opens along the jet channel, F denotes an airflow force acted on the gate, S is a cross-sectional area of the gate, v denotes an airflow rate, and ρ represents an airflow density.

17. The vertical-axis wind turbine of claim 15, wherein the adaptive and self-reset opening and closing control device is a hydraulic support rod or a spring support rod wound with a metal spring arranged inside the air jet channel, with both ends of the hydraulic support rod or spring support rod connected to the gate and the inner wall of the air jet channel respectively using T-shaped joints.

* * * * *